(12) United States Patent
Kondrus et al.

(10) Patent No.: US 12,134,057 B2
(45) Date of Patent: Nov. 5, 2024

(54) FLAME TRAP FILTER

(71) Applicant: R. STAHL SCHALTGERÄTE GMBH, Waldenburg (DE)

(72) Inventors: Elena Kondrus, Künzelsau (DE); Jürgen Schmitt, Öhringen (DE)

(73) Assignee: R. STAHL SCHALTGERATE GMBH, Waldenburg (DE)

( * ) Notice: Subject to any disclaimer, the term of this patent is extended or adjusted under 35 U.S.C. 154(b) by 0 days.

(21) Appl. No.: 17/611,077

(22) PCT Filed: May 5, 2020

(86) PCT No.: PCT/EP2020/062468
§ 371 (c)(1),
(2) Date: Nov. 12, 2021

(87) PCT Pub. No.: WO2020/229235
PCT Pub. Date: Nov. 19, 2020

(65) Prior Publication Data
US 2022/0233989 A1  Jul. 28, 2022

(30) Foreign Application Priority Data
May 14, 2019 (DE) .......................... 102019112618.5

(51) Int. Cl.
*B01D 46/00* (2022.01)
*A62C 4/00* (2006.01)
(Continued)

(52) U.S. Cl.
CPC ............ *B01D 46/0093* (2013.01); *A62C 4/00* (2013.01); *B01D 39/08* (2013.01); *B01D 39/10* (2013.01);
(Continued)

(58) Field of Classification Search
None
See application file for complete search history.

(56) References Cited

U.S. PATENT DOCUMENTS 2,464,301 A * 3/1949 Francis, Jr. ............ B01D 39/20
156/277
3,268,990 A * 8/1966 Adler ..................... B01D 39/12
29/423

(Continued)

FOREIGN PATENT DOCUMENTS

AT         132793 B     4/1933
CN         107073306 A  8/2017
(Continued)

OTHER PUBLICATIONS

International Search Report for International Application No. PCT/EP2020/062468; Date of Completion: Sep. 17, 2020; Date of Mailing: Sep. 28, 2020; 20 pages.
(Continued)

*Primary Examiner* — Gabriel E Gitman
(74) *Attorney, Agent, or Firm* — CANTOR COLBURN LLP

(57) ABSTRACT

A flame trap filter including a grid structure, wherein the grid structure determines grid openings which are bordered by intersecting strip sections, and/or wherein the grid structure is formed by a laid scrim. A method for producing a grid structure of a flame trap filter includes the step of allowing a substance to solidify on a substrate, in order to form at least one strip section of the grid structure. Alternatively or in addition, the method includes the step of compressing a material for the flame trap filter or a semi-finished product of the flame trap filter at points, e.g. by mechanically deforming the material or the semi-finished product, in order to form at least one strip section of the grid structure.

15 Claims, 4 Drawing Sheets

(51) Int. Cl.
  *B01D 39/08* (2006.01)
  *B01D 39/10* (2006.01)
  *B23K 26/384* (2014.01)

(52) U.S. Cl.
  CPC .. *B01D 46/0001* (2013.01); *B01D 2239/0457* (2013.01); *B01D 2239/0613* (2013.01); *B01D 2239/0681* (2013.01); *B01D 2239/10* (2013.01); *B01D 2273/20* (2013.01); *B01D 2275/10* (2013.01); *B01D 2275/202* (2013.01); *B23K 26/384* (2015.10)

(56) References Cited

U.S. PATENT DOCUMENTS

| | | | |
|---|---|---|---|
| 6,604,644 | B1 | 8/2003 | Fenton |
| 8,834,153 | B2 | 9/2014 | Helmsen et al. |
| 9,403,326 | B2 | 8/2016 | Mann et al. |
| 10,537,760 | B2 * | 1/2020 | Barz ............... B01D 46/12 |
| 2010/0311001 | A1 | 12/2010 | Helmsen et al. |
| 2013/0206759 | A1 * | 8/2013 | Wurz ............... A62C 4/00 220/88.2 |
| 2015/0060464 | A1 | 3/2015 | Mann et al. |
| 2017/0144252 | A1 * | 5/2017 | Arjakine ............ F01D 5/005 |
| 2020/0179735 | A1 | 6/2020 | Arnhold et al. |

FOREIGN PATENT DOCUMENTS

| | | |
|---|---|---|
| DE | 102010016782 A1 | 11/2011 |
| DE | 102013109259 A1 | 3/2015 |
| DE | 102014116149 A1 | 5/2016 |
| DE | 102017112162 A1 | 12/2018 |
| EP | 2260906 A1 | 12/2010 |
| EP | 2842608 A2 | 3/2015 |
| EP | 3199207 A2 | 8/2017 |
| RU | 2229909 C1 | 6/2004 |
| RU | 2447518 C1 | 4/2012 |
| RU | 2578116 C2 | 3/2016 |
| RU | 2017119229 A | 12/2018 |
| WO | WO-2011114175 A1 * | 9/2011 ............ B21F 27/10 |
| WO | 2016070874 A1 | 5/2016 |
| WO | WO-2019021224 A1 * | 1/2019 ............ C22C 38/06 |

OTHER PUBLICATIONS

Translation of International Search Report for International Application No. PCT/EP2020/062468; Date of Completion: Sep. 17, 2020; Date of Mailing: Sep. 28, 2020; 3 pages.
Written Opinion for International Search Report for International Application No. PCT/EP2020/062468; Date of Mailing: Sep. 28, 2020; 13 pages.
English Translation of First Chinese Office Action for Chinese Application No. 202080035548.3 Issued Jun. 9, 2022; 10 Pages.
First Chinese Office Action for Chinese Application No. 202080035548.3 Issued Jun. 9, 2022; 13 Pages.
Office Action and Search Report dated Jul. 26, 2023; RU Application No. 2021136099/03; 11 pages (non-English).
Second Chinese Office Action dated Nov. 3, 2022; Chinese Application No. 202080035548.3; 3 Pages (non-English).
Second Chinese Office Action dated Nov. 3, 2022; Chinese Application No. 202080035548.3; 5 Pages (English).
Rule 94(3) Communication dated Aug. 17, 2023; EP Application No. 20724469.0; 11 pages (non-English).

* cited by examiner

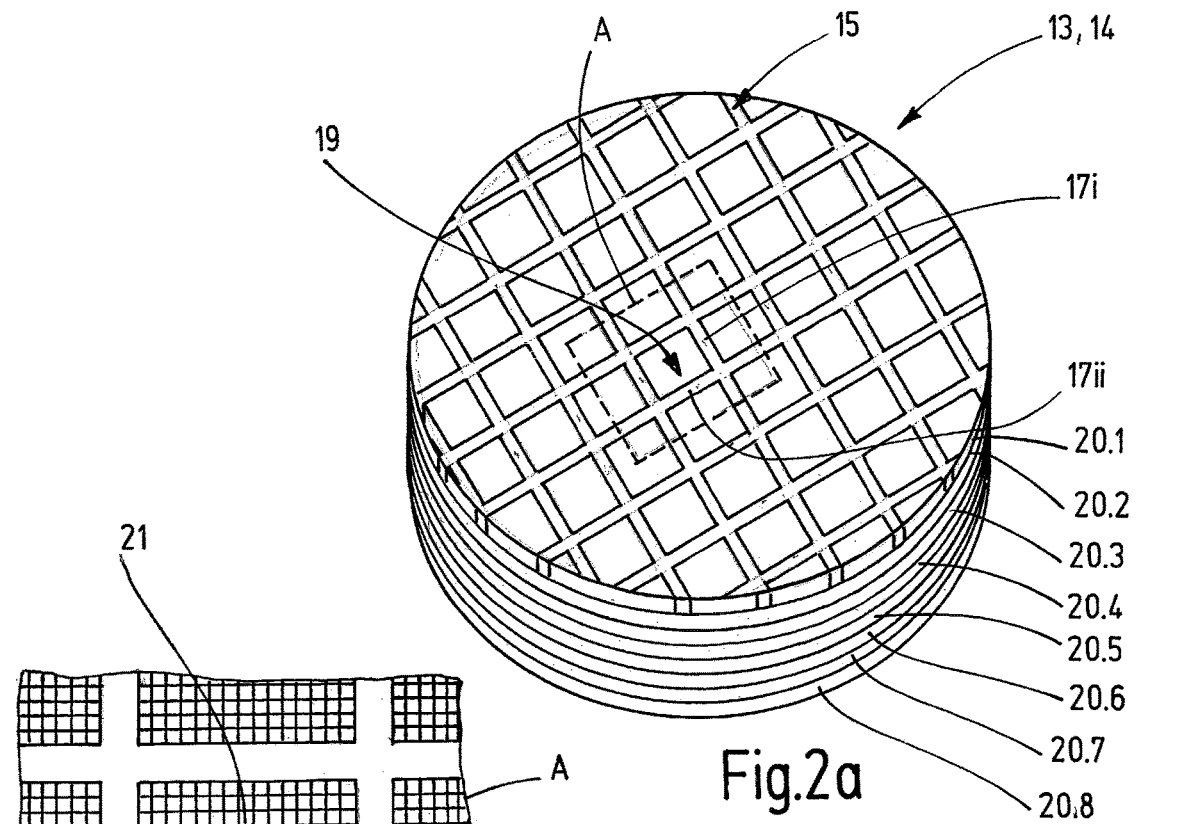
Fig.2a
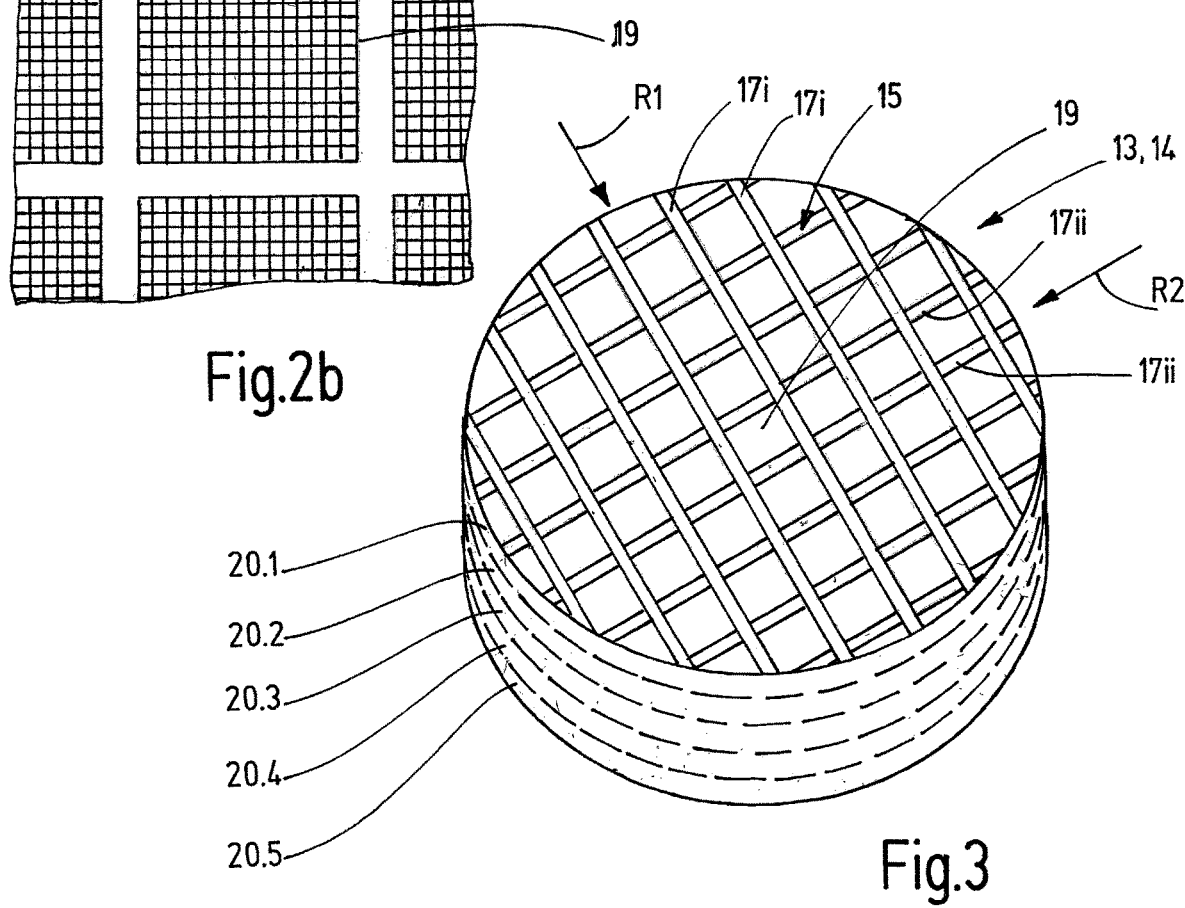
Fig.2b
Fig.3

FLAME TRAP FILTER

CROSS REFERENCE TO RELATED APPLICATIONS

The application is a National Stage application of PCT/EP2020/062468, filed on May 5, 2020, which claims the benefit of German Application No. 10 2019 112 618.5, filed on May 14, 2019, the contents each of which are incorporated herein by reference thereto.

TECHNICAL FIELD

The invention refers to a flame trap filter for explosion protection.

BACKGROUND

A flame trap arrangement is known from EP 2 260 906 A1 that comprises an intermediate layer between two flame trap inserts allowing a radial distribution of gas escaping from one flame trap insert in principle in direction toward the second flame trap insert.

DE 10 2014 116 149 A1 describes a flame trap filter having an arrangement of subsequent woven filter layers. The opening width of the openings of a filter layer distinguishes from the opening width of openings of the subsequent filter layer.

DE 10 2017 112 162 A1 describes a flame trap filter having a number of woven layers having an intermediate layer with meshes comprising a mesh width of the intermediate layer openings that is larger than the size of meshes of the woven layers.

It can be considered as object of the present invention to provide an improved concept for flame trap filters. Particularly a need for pressure relief bodies exists in which the thermal input into the pressure relief body is distributed on a large surface and thus the effectiveness of the pressure relief body for pressure relief is increased.

BRIEF SUMMARY

Disclosed is a flame trap filter having at least one grid structure, wherein the at least one grid structure defines grid openings that are limited by web sections intersecting one another and/or wherein the at least one grid structure is formed by a laid scrim.

Also disclosed is a pressure relief device having a flame trap filter having at least one grid structure, wherein the at least one grid structure defines grid openings that are limited by web sections intersecting one another and/or wherein the at least one grid structure is formed by a laid scrim.

A method for manufacturing a grid structure of a flame trap filter having at least one grid structure, wherein the at least one grid structure defines grid openings that are limited by web sections intersecting one another and/or wherein the at least one grid structure is formed by a laid scrim, wherein a substance is solidified on a substrate, and/or wherein a material for the flame trap filter or a semi-finished product of the flame trap filter is compressed at locations.

The flame trap filter according to the invention comprises a grid structure. The grid structure according to the invention defines grid openings that are limited by intersecting web sections that are preferably arranged transverse, e.g. orthogonal, to a flooding direction of the pressure relief body and/or the grid structure according to the invention is formed by a laid scrim.

The web sections can be straight or curved. Web sections are preferably strip and/or rod shaped. The grid openings limited by intersecting web sections can be polygonal, preferably rectangular, particularly square. It is alternatively also possible that intersecting web sections limit circular or elliptical grid opening. The intersecting web sections can form a perforated grid, e.g. perforated metal sheet, that comprises, for example, circular and/or elliptical grid openings. Alternatively, a perforated foil can comprise intersecting web sections that limit, for example, circular and/or elliptical grid openings.

The laid scrim formed as an alternative or in addition is a two-dimensional structure of at least two layers having webs extending in one direction in a straight or curved manner in each case. Webs can be particularly strip and/or rod shaped. The laid fabric can be bidirectional or multi-directional. The directions are orientated transverse to each other, e.g. orthogonal, and extend transverse and particularly orthogonal to the flooding direction of the flame trap filter.

By means of the grid structure of the inventive flame trap filter, flooding channels or screens are formed. The flow through the filter is divided into partial flows. This may result in a distribution of the thermal input into the flame trap filter on a larger area. In doing so, the effectiveness of the flame trap filter can be improved.

In embodiments the flame trap filter can be formed from an arrangement of at least two layers that are not directly connected with each other. They form a flame trap filter arrangement. One or more of the layers can consist of one single layer or can be combined of at least two sub-layers that are directly connected with each other.

Two more layers of the flame trap filter can be arranged to adjoin one another or to abut one another, wherein these layers may be directly attached with one another or may not be directly attached with one another. The grid structure can form a layer that directly adjoins a layer or is arranged to abut against a layer that individually or guarantees a flameproof condition of the flame trap filter arrangement, if applicable together with additional layers. As an alternative, the grid structure can be arranged with distance to the layer that guarantees the flameproof condition.

Layers of the flame trap filter can form a flame trap filter body. For this purpose the layers can be connected with each other. For example, the layers can be sintered, glued, welded with each other or can be connected with each other in another manner, particularly by substance bond. For example, the grid structure can form a layer or can be part of a layer that is connected with an additional layer. In other embodiments the grid structure can form a layer or can be part of a layer that is separate from the adjacent layer. Particularly such a layer that is not connected with the adjacent layer can also be denoted as plane of the flame trap filter arrangement.

The flame trap filter individually or together with additional elements can form a pressure relief body for an explosion-protected housing for electrical operating means, particularly in the explosion protection type flameproof enclosure. By means of the grid structure, a pressure relief flow can be divided in partial flows, whereby the thermal input in the pressure relief body is distributed on a larger area and thus the effectiveness of the pressure relief body for pressure relief is increased. Another advantage of the flame trap filter according to the invention forming a pressure relief body for an explosion-protected housing is that an additional cumbersome processing of the housing may be avoided. This is because the grid structure is part of the flame trap filter and thus the pressure relief body. It is therefore not required to introduce part openings or grid webs in the wall of the explosion-protected housing.

The grid structure forms at least one layer of the flame trap filter. The flame trap filter can comprise at least one additional layer. At least one or all of the additional layers can be formed by a grid structure according to the invention as described herein. Accordingly, one or each additional layer can comprise a grid structure that defines grid openings that are limited by intersecting web sections from one another and/or wherein the grid structure is formed by a laid scrim. As an alternative or in addition, the flame trap filter according to the invention can comprise a number of woven layers.

A grid structure according to the invention can form an additional layer between two additional layers. As an alternative or in addition, the grid structure according to the invention can form a terminal layer at the side of the arrangement of additional layers orientated opposite to the flow direction or can form a terminal layer at the side of the arrangement of additional layers facing in flow direction. If the flame trap filter forms a pressure relief body of a pressure-resistant housing, the flow direction is preferably from the interior of the housing outwardly.

Embodiments of the flame trap filter according to the invention having grid openings that are limited from one another by intersecting web sections comprise, for example, at least one layer of sheet metal or foil with a plurality of openings that form grid openings. These openings can be manufactured by cutting sections out of the sheet metal or foil material. The grid structure can be formed by one or multiple of such layers. If multiple layers are present, the openings are preferably arranged on top of each other, such that the layers that are connected or not connected with each other form channels or screen openings as grid openings that extend through the arrangement of layers in an orthogonal orientation.

Independent from the embodiment of the grid structure with intersecting web sections limiting an opening, the web sections themselves are preferably free from openings.

The grid structure can be particularly manufactured by shearing (stamping) and/or laser cutting of the grid structure from foil or sheet metal. In doing so, the grid opening area is respectively cut out of the foil or sheet metal under material losses. Thereby one or more cutting lines are introduced into the material and the cutting or stamping remnant—that preferably foil or sheet metal shaped and/or comprises a shape different from a chip shape—is removed within the one or more stamping or cutting lines in order to form the grid opening in the sheet metal or foil. The grid structure is preferably not manufactured by perforating, wherein the foil of sheet metal is drilled by means of a laser, an electron beam or a mechanical drill. The grid structure can be formed by an expanded grid. This can consist of metal—in this case also denoted as expanded metal—or plastic. For manufacturing of expanded grids or expanded metals, the meshes (grid openings) are created by offset cuts, preferably substantially without material loss, under expanding deformation.

As an alternative or in addition an inventive grid structure can be manufactured by laying strips, particularly foil or cheap metal strips.

If the grid structure is formed by a laid scrim, each layer is preferably exclusively formed by webs extending in one direction. Webs of a first direction extend preferably either on top of or below (in case of respective potentially virtual orientation of the flame trap filter) the arrangement of webs of the second direction. A change does preferably not occur.

In relation to a woven fabric in which grid openings are formed by meshes, wherein between two adjacent meshes one single longitudinal warp element or longitudinal weft element is arranged in a grid structure with intersecting web sections or a grid structure that is formed by a laid scrim, the length of the webs can be shorter than in a woven fabric in which each "thread" comprises a kind of wavy structure in order to alternatingly extend on top of or below transverse extending webs or threads, provided equal dimensions of the grid structure. In doing so, the thermal conductivity of the web structure is improved compared with a woven fabric.

Additional layers that can be provided in addition to the grid structure in embodiments can comprise openings, the opening area of which is defined in an opening area range. The opening area of the grid openings of the grid structure is preferably multiple times, preferably at least ten times or at least thirty times or even at least one hundred times larger than the largest opening area within the opening area range.

In embodiments the grid structure can be at least in sections a woven fabric comprising meshes, the mesh width of which is in a first mesh width range and comprising meshes, the mesh width of which is in a second mesh width range, wherein each mesh width in the second mesh width range is larger than the largest mesh width in the first mesh width range. The meshes having mesh widths in the second mesh width range form the grid openings. The grid openings can have a uniform mesh width. Arrangements of multiple longitudinal warp elements or weft elements extend between adjacent grid openings. They are woven with weft elements or warp elements extending transverse thereto. Preferably in a manner such that the longitudinal weft elements or warp elements within the arrangement between two grid openings are individually or in groups alternatingly located above or below single or groups of warp elements or weft elements extending transverse thereto.

The mesh widths in the second mesh width range are preferably at least five times larger or even at least ten times larger than the largest mesh widths in the first mesh width range. Accordingly, a grid structure can be woven, wherein in regular or irregular distances between adjacent warp threads or adjacent weft threads a distance is selected from the second mesh width range, wherein the webs of the grid structure are formed by longitudinal warp elements or longitudinal weft elements that limit meshes between each other having mesh widths in the first mesh width range. The webs are preferably strip-shaped structures woven with one another on the level of warp and weft elements comprising multiple warp elements or multiple weft elements respectively. The warp elements and weft elements can be particularly wires or strips of metal or plastic. The mesh width zero can be particularly part of the first mesh width range. The warp elements and weft elements that form meshes having a mesh width in the first mesh width range can thus form zero meshes. For example, the warp elements and/or weft elements can be wire, thread and/or strip-shaped.

In embodiments the grid structure can be created by compressing a material for the flame trap filter or a semi-finished product of the flame trap filter, wherein the webs of the grid structure are formed by locations at which the material or the semi-finished product is compressed.

Compressing may have been carried out by mechanical deformation. Alternatively, compressing may have been carried out by introducing a substance in one or more layers of the material or the semi-finished product of the flame trap filter. Compressing may have been carried out on a single side of the material or the semi-finished product of the flame trap filter facing the flow or the side of the material of the flame trap filter or the semi-finished product of the flame trap filter facing in flow direction.

By compressing and/or mechanical deformation, a structure of the flame trap filter can be created in which the thickness of the flame trap filter measured at a web section is less than the thickness measured in a grid opening of the grid structure.

The side facing the flow and/or the side facing away from the flow can have a wavy structure having a period corresponding to the opening width of the grid structure. Due to compressing, cushion-like areas can be formed in which the layers are less compressed between compressed locations that form the web sections.

As an alternative or in addition, web sections of the grid structure can be manufactured by solidifying a substance on a substrate. The substrate can be a material of the filter body, a semi-finished product of the filter body or an aid substrate that is removed for manufacturing the flame trap filter in a later process step. For example, the substance can be silicone glue or metal. For example, the solidified substance can be a weld bead. The web sections can be formed by an additive manufacturing process. In embodiments the web sections can be created by welding and/or by laser deposit welding.

The web sections can block the direct passage of gas through openings of a layer of the flame trap filter. The substance can close openings of a layer of a flame trap filter.

In embodiments it is possible that the layers are free of connection locations for connection of the layers within the projection of each grid opening area of the grid structure in flooding direction. In other words the space past or followed by virtual shift of the grid opening area in flooding direction is preferably free of connection locations for connection of layers.

With the method for manufacturing a grid structure according to the invention, an inventive flame trap filter can be manufactured, for example, as described herein. According to the invention, a substance can be solidified on a substrate, particularly on a material or semi-finished product of the flame trap filter. Alternatively or in addition, a material for the flame trap filter or a semi-finished product of the flame trap filter can be compressed at locations that all together define a grid in order to create the grid structure, e.g. by mechanical deformation of the material or the semi-finished product.

BRIEF DESCRIPTION OF THE DRAWINGS

Additional exemplary features and embodiments of the inventive flame trap filter, the pressure relief body as well as the method are derived from the dependent claims, the subsequent description as well as the figures. The drawings show:

DETAILED DESCRIPTION

Embodiments of explosion-protected housings are explosion protected according to the explosion protection category "flameproof enclosure". Inventive housings can comprise one or more pressure relief devices having at least one inventive flame trap filter in each case.

Figure 1:
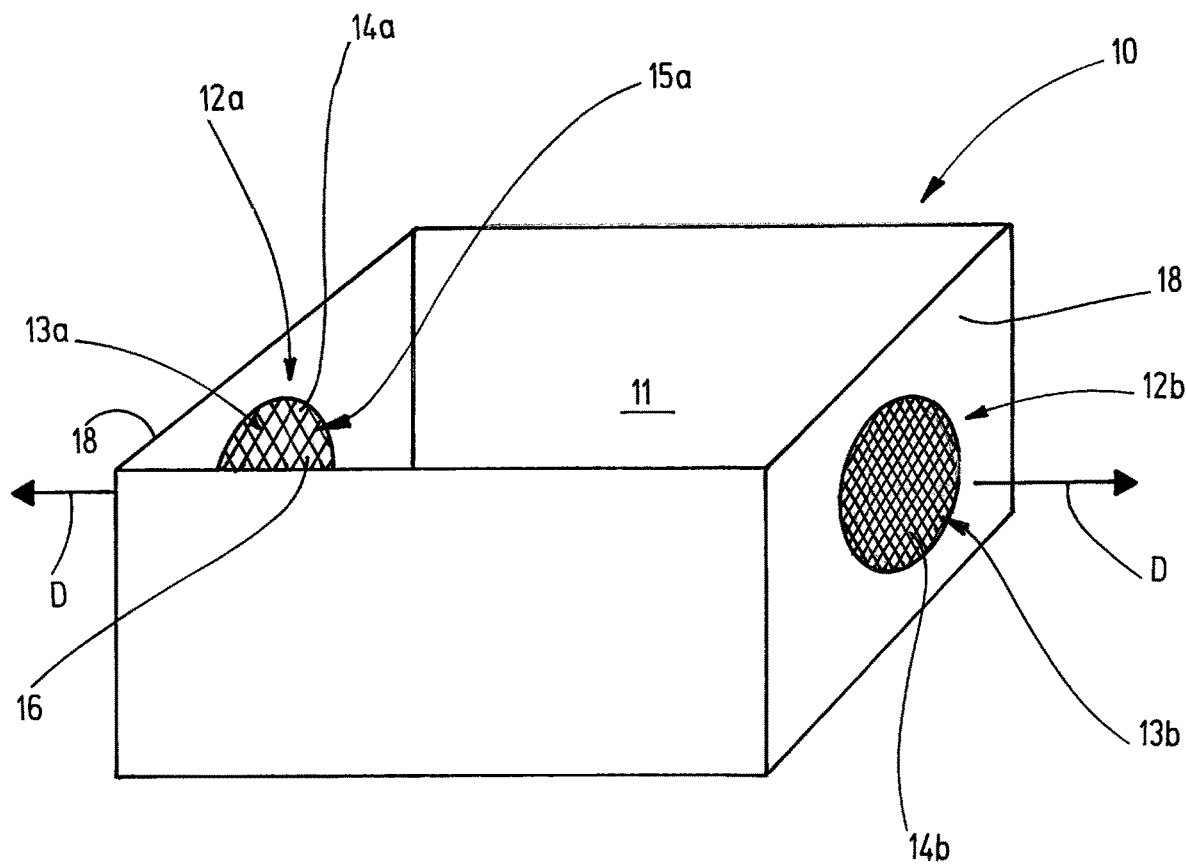
FIG. 1—a perspective view of an embodiment of an opened and apart therefrom, explosion-protected housing having two pressure relief devices with one inventive flame trap filter in each case, FIG. 2a—a perspective view of an embodiment of the inventive flame trap filter, FIG. 2b—a top view of a part of the flame trap filter according to FIG. 2a, FIG. 2c—a top view of a part of the flame trap filter according to a further embodiment, FIG. 2d—a top view of a part of a flame trap filter according to yet another embodiment, FIG. 3—a perspective view of another embodiment of an inventive flame trap filter, FIG. 4a—a sectional view through a yet additional embodiment of an inventive flame trap filter, wherein the flooding direction is within the sectional plane, FIG. 4b—a top view of a part of the flame trap filter according to FIG. 4a, FIG. 5—a perspective view of a semi-finished product of an example of a fourth embodiment of the inventive flame trap filter.

FIG. 1 shows an embodiment of such an explosion-protected housing 10 with removed cover. The housing 10 defines an interior 11. The housing 10 comprises two pressure relief openings 12a, 12b. These are closed in a flameproof manner by pressure relief bodies 13a, 13b having at least one inventive flame trap filter 14a, 14b in each case. A gas exchange through the flame trap filter 14a, 14b is in principle possible, e.g. in order to achieve pressure compensation between the interior 11 of housing 10 and its environment. In case of an explosion in interior 11 of housing 10, however, gases or particles can escape from housing 10 through flame trap filters 14a or 14b only cooled down, such that a gas or particles cannot ignite the atmosphere outside housing 10. In the illustrated embodiment the flame trap filter 14a is arranged in a first pressure relief body 13a such that the inventive grid structure 15a for dividing the pressure relief opening 12a in multiple partial openings 16 is facing the interior 11 of the explosion-protected housing 10. In the case of the first pressure relief body 13a the grid structure 15a is accordingly passed by a flow prior to at least one additional layer of the flame trap filter 14a. The same also applies to the flame trap filter 14b of the second pressure relief body 13b, the grid structure of which is covered by at least one additional layer of the flame trap filter 14b in the view shown in FIG. 1. Alternatively, the at least one flame trap filter 14a, 14b can be orientated such that the inventive grid structure faces outwardly, such that the grid structure is passed by flow after gas has flown through the at least one additional layer of the flame trap filter of the second pressure relief device. In yet further embodiments the grid structure can form an intermediate layer between at least two additional layers of the flame protection filter (not illustrated).

In each case each pressure relief body 13a, 13b divides the pressure relief opening 12a, 12b in the housing 10 into partial openings 16.

The sub-division of the pressure relief opening 12a, 12b in partial openings 16 is carried out by the web sections 17 (compare e.g. FIG. 2a) of grid structure 15a. Because the web sections are not monolithic parts of wall 18 of housing 10 that limits the pressure relief opening 12a or 12b, a cumbersome processing of the housing wall 18 for manufacturing of grid structure 15a for spreading the thermal input and/or the gas flow is not required. It is rather sufficient to form a pressure relief opening 12a, 12b with continuous opening surface in the wall 18 of housing 10 that is only subdivided in partial openings 16 by a flameproof closing of the pressure relief opening 12a or 12b by means of the pressure relief bodies 13a, 13b.

With the grid structure 15a created by web sections 17 a pressure relief flow outwardly out of interior 11 of housing 10 is subdivided in partial flows, whereby the thermal input in the pressure relief body 13a (the same applies for the pressure relief body 13b) is distributed over a larger area and thus the effectiveness of the pressure relief body 13a for pressure relief is increased.

In an embodiment the grid openings of the grid structure 15 can be limited by intersecting web sections 17i, 17ii. Web section 17i, 17ii are arranged transverse, preferably orthogonal to a flooding direction D of the pressure relief body 13a, 13b. Web sections 17i, 17ii can be straight or curved. Web sections 17i, 17ii can be rod-shaped. Web sections 17i, 17ii can form a perforated grid. Preferably web sections 17i, 17ii extend in a common plane. The grid structure 15a is preferably planar and/or the intersecting web sections 17i, 17ii are arranged in one plane.

A regular grid structure 15a that is formed by intersecting web sections 17i, 17ii is exemplarily shown in a perspective view in FIG. 2. Index a or b is omitted in the following, because the first flame trap filter 14a and/or the second flame trap filter can be carried out according to one of the subsequently described embodiments, for example. The grid structure 15a shown in FIG. 2 comprises rectangular, here square, grid openings 19 that form the partial openings 16 of the pressure relief opening 12. The grid openings 19, apart from the grid openings at the edge of the grid structure 15, comprise preferably the same area. The grid structure 15 is illustrated in FIG. 2 as a terminal layer that either faces a gas flow direction D from the interior 11 of housing 10 or faces in gas flow direction D out of the interior 11 outwardly. It is, however, alternatively or in addition also possible that a grid structure 15 having grid openings 19 that are formed by web sections 17i, 17ii intersecting one another, forms an intermediate layer.

In the illustrated embodiment the outer contour of the grid structure 15 is round. The grid structure 15 can, however, also be polygonal or angular, e.g. rectangular or square. Preferably the shape of the outer contour is geometrically similar to the shape of the outer contour of the pressure relief body 13 and/or the pressure relief opening 12.

For example, the grid structure 15 can be manufactured from a sheet metal or foil. Intersecting web sections 17i, 17ii can be formed, for example, in that grid openings 19 are cut off the foil or sheet metal, e.g. by laser cutting and/or stamping. The web sections 17i, 17ii can be made of metal or plastic. The grid structure 15 according to FIG. 2 can be cut or stamped out of a sheet metal part or a metal foil, for example. In doing so, the grid opening areas 19 are manufactured under material losses.

In a modification the grid structure 15 can be formed by an expanded grid, particularly expanded metal (not shown). For manufacturing of an expanded grid, meshes are created by offset cuts without material loss under concurrent expanding deformation. These meshes are at least limited at two sides by web sections intersecting one another. Without additional measures, however, pairs of web sections intersecting one another do not extend parallel to a common plane, but even if the grid structure as a whole extends in a grid plane, the pairs of intersecting web sections are extending obliquely to this grid plane. By mechanical deformation transverse to the grid plane, all pairs can be deformed such that they extend parallel to the grid plane.

Due to intersecting web sections 17i, 17ii, heat introduced at one point in the grid structure 15 cannot only be conducted substantially by the web in which the heat is introduced, as in case of a woven fabric, but the heat conduction can be partly taken by the intersecting web section at the intersections of two web sections 17i, 17ii. If the webs or web sections 17i, 17ii are straight, short webs are obtained and as a result a remarkably good heat conductivity can be obtained. Contrary thereto, a web has to have a wavy shape in a woven fabric in order to alternatingly extend above or below of crossing rods. This elongates the web compared with a straight web in case of equal area of the flame trap filter.

Due to the intersecting web sections 17i, 17ii, the grid opening limited by the intersecting web sections 17i, 17ii is delimited from an adjacent grid opening. A cross flow from one grid opening in the plane of the grid structure is thus impeded or blocked. The intersecting web sections 17i, 17ii thus form flooding screen openings or channels for a separation of the gas flow in partial flows at least within the plane of the grid structure 15. This is contrary to a woven layer in which the webs cross, but not intersect such that less flow resistance encounters a cross flow in the woven layer.

The flame trap filter 14 comprises additional layers or sub-layers 20.2 to 20.8 that can form grids respectively. These additional layers 20.2 to 20.8 can be woven layers. Alternatively, one or more additional layers 20.2 to 20.8 can be formed from a laid scrim and/or intersecting web sections. It is alternatively or additionally also possible that at least one or all additional layers 20.2 to 20.8 are manufactured from entangled fiber material or felt material. The flame trap filter 14 can be formed by an arrangement of planes 20.1 to 20.8 that are not connected with one another. Preferably the grid structure 15 (layer 20.1) and the additional layers 20.2 to 20.8 are, however, connected with one another. For example, the layers 20.1 to 20.8 can be glued with one another, can be connected with one another by sintering, can be connected with one another by mechanical deformation, by screwing or the like. In other embodiments the grid structure 15 is not connected with the finer grids of layers 20.2 to 20.8, wherein the finer grids of layers 20.2 to 20.8 are connected with one another or not connected with one another. Embodiments are possible in which more or less than eight layers 20.1 to 20.8 are arranged adjacent or on top of each other and namely in contact with one another or not in contact with one another.

Grid layers 20.2 to 20.8 present in addition to the grid structure 15 comprise a plurality of openings 21, the opening area of which is defined within an opening area range. The opening area of the grid openings 19 of the grid structure 15 is preferably multiple times larger, preferably at least five times or even at least ten times or even at least thirty times or even at least one hundred times larger than the largest opening area within the opening area range. An example for this is shown in FIG. 2b. It illustrates a top view of a part of the inventive flame trap filter 14 according to FIG. 2a. The section A shown in FIG. 2b is illustrated in dashed lines in FIG. 2a. As illustrated, layer 20.2 arranged below the grid structure 15 forms openings 21 having an opening area that is multiple times smaller, in the present embodiment far more than ten times smaller than the opening area of a grid opening of the grid structure 15. In doing so, a coarse division of the pressure relief flow in partial flows is achieved by grid structure 15. The flame trap filter 14 can be configured such that the grid structure 15 furthermore does not contribute to the flameproof condition. Rather remaining layers 20.2 to 20.8 can together already provide flameproof condition. The grid structure 15 serves only for distribution of the gas flow over the entire area of the flame trap filter 14.

While seven layers 20.2 to 20.8 are illustrated in the illustrated embodiment that together guarantee the flameproof condition, it could also be more or less layers (e.g. only one).

Alternatively or additionally and different to the illustrated embodiment, more than only one layer 20.1 can form the inventive grid structure 15. For example, a flame trap filter 14 can have at least two layers (not illustrated) that respectively form inventive grid structures 15. The multiple, at least two grid structures provided exemplarily subdivide the flow through the flame trap filter subsequently in coarse partial flows. Between at least two grid structures one or more finer grids can be arranged. With the at least two grid structures the gas flow can be controlled or guided.

The opening width (e.g. mesh width) of the multiplicity of openings 21 provided in the additional layers 20.2 to 20.8 are preferably defined within an opening width range. Preferably the width of the web sections 17i, 17ii of grid structure 15, as apparent from FIG. 2b, is larger than the largest opening width within the opening width range. Preferably the width of each web section 17i, 17ii covers at least one or at least two openings 21 of layer 20.2 arranged below the web sections 17i, 17ii. "Below" refers to a respective—potentially virtual—orientation of flame trap filter 14.

Figure 2C:
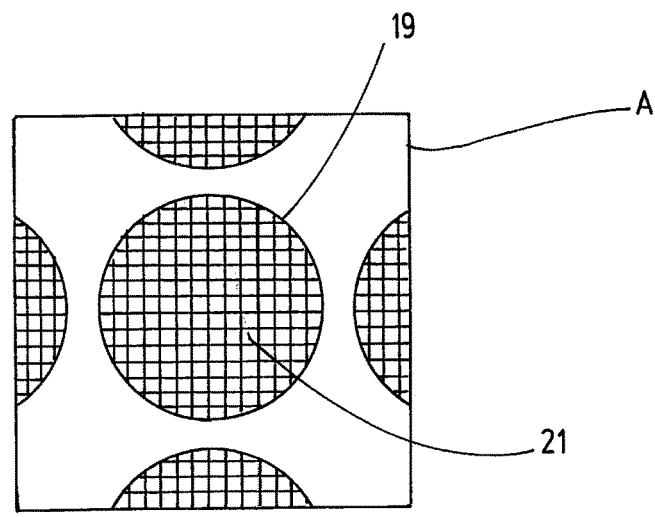

FIG. 2c shows a section A of another embodiment of the inventive flame trap filter 14. FIG. 2c illustrates a top view of the embodiment in part. Different to the embodiment illustrated in FIG. 2a in which a perforated grid with square openings is shown, the grid structure of the embodiment illustrated in FIG. 2c is a perforated grid, e.g. perforated sheet metal or perforated foil, having circular grid openings 19. Apart therefrom the description referring to the embodiment according to FIGS. 2a and 2b can be used for the explanation of the embodiment according to FIG. 2c.

Figure 2D:
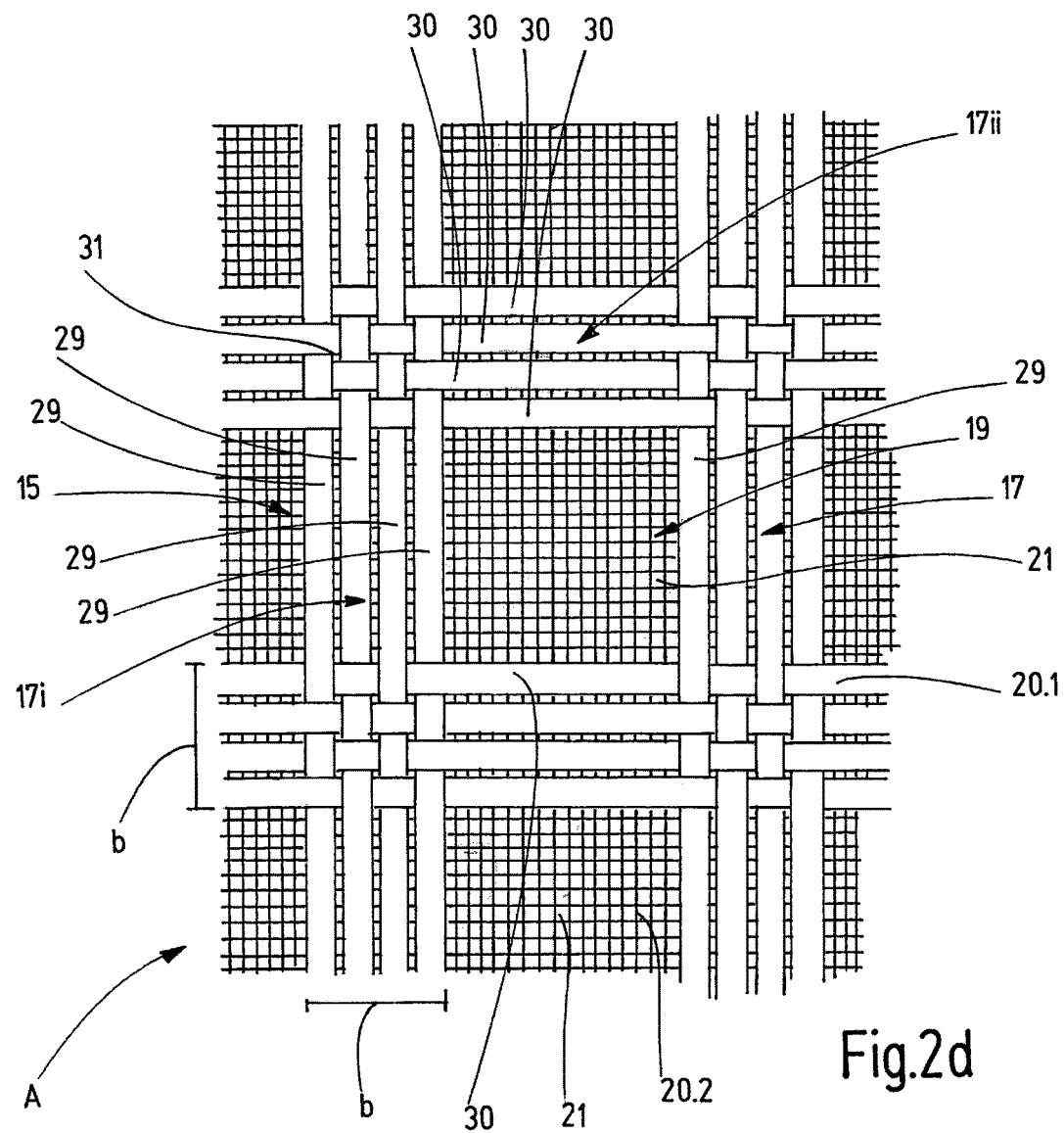

FIG. 2d shows a section A of a further embodiment of an inventive flame trap filter 14. FIG. 2c illustrates a top view of the embodiment in part. The grid structure 15 can comprise grid openings 19 arranged in regular (as e.g. illustrated in FIG. 2a) or irregular distances that are formed in the embodiment according to FIG. 2d by meshes 19 between two longitudinal warp elements 29 and two longitudinal weft elements 30, wherein the meshes 19 have a mesh width in a second mesh width range. Between the meshes 19 webs 17i, 17ii extend that are formed of an arrangement of multiple longitudinal warp elements extending adjacent to one another or an arrangement of multiple longitudinal weft elements 30 extending adjacent to one another. The warp elements 29 and/or weft elements 30 can be particularly wire-, thread- or strip-shaped. Within the arrangement meshes 31 are formed between adjacent weft elements 30 and warp elements 29 having a mesh width in a first mesh width range. The mesh width in the second mesh width range is larger than each mesh width in the first mesh width range. The mesh widths in the second mesh width range are preferably at least five times larger or even at least ten times larger than the larges mesh width in the first mesh width range. The first mesh width range can particularly comprise the mesh width zero. Accordingly, zero meshes can form meshes 31 in the arrangements.

The grid structure according to FIG. 2d comprises intersecting web sections 17i, 17ii that limit a grid opening 19. The webs 17i are formed of an arrangement of multiple longitudinal warp elements 29 in each case, wherein distant thereto multiple transverse, preferably orthogonal, extending longitudinal weft elements 30 are woven—preferably in plain weave—forming a further web 17ii, wherein the web 17i, 17ii limit a mesh 19 (grid opening) having a mesh width in the second mesh width range and the weft and warp elements limit meshes in the intersection ranges of the arrangement have a mesh width less than the mesh width of mesh 19, for example mesh width zero, between intersecting arrangements. As illustrated, longitudinal weft elements 30 or longitudinal warp elements 29 within the arrangement are alternatingly arranged above or below singular warp elements 29 or weft elements 30 extending transverse thereto between two grid openings 19.

The mesh width of the grid opening 19 is preferably and as apparent from FIG. 2d larger than the width b of each web section 17i, 17ii that limit the grid opening 19, e.g. at least five times larger or at least ten times larger. This applies accordingly for other inventive embodiments, e.g. for the embodiments that are illustrated in the further figures.

In the view according to FIG. 2d, a layer 20.2 having openings 21 that are smaller than the grid opening 19 is schematically illustrated below the grid structure 15. For this and for additional optional features reference can be made to the description referring to the further embodiments.

FIG. 3 shows an example of another embodiment of an inventive pressure relief body 13. The pressure relief body can have the inventive flame trap filter 14 or can consist thereof. For the flame trap filter 14 reference can be made to the above description as long as it is not described otherwise in the following. The grid structure 15 is formed of a laid scrim in the embodiment illustrated in FIG. 3. The laid scrim comprises a layer of webs 17i orientated in a first direction R1 and a second layer of webs 17ii orientated in a second direction R2 transverse to the first direction R1, e.g. orthogonal. In doing so, rectangular, particularly square, or other polygonal grid openings 19 can be created. For example, the laid scrim can be formed by arranging of sheet strips, e.g. sheet metal strips, in the first direction R1 and the arrangement of additional sheet strips in the second direction R2. As illustrated, preferably no web 17i, 17ii changes the layer, but all webs 17i or 17ii are arranged on one side over the entire length of the arrangement of webs 17ii or 17i orientated transverse thereto. The sheet strips of different orientation are preferably connected with one another at the crossing locations, e.g. glued, sintered, welded or the like. The webs 17i and/or 17ii of one or both layers are preferably straight in order to provide a connection to the edge of the flame trap filter 14 that is as short as possible in order to distribute heat in the pressure relief body 13 and/or discharge heat in the housing wall 18.

Another possibility for configuration of the inventive grid structure is to compress a material for the flame trap filter 14 or a semi-finished product of the flame trap filter 14 by mechanical deformation at locations 22 that together form a grid structure 15. The locations 22 at which the material or semi-finished product is compressed by mechanical deformation form the web sections 17i, 17ii of the grid structure 15. The web sections 17i, 17ii thus intersect. Preferably the web sections 17i, 17ii are arranged in one plane. A wave structure is obtained having a period that corresponds to the opening width of the grid structure 15. A respectively manufactured embodiment is shown in part cross-sectional illustration in FIG. 4a. The flow or flooding direction D is within the cross-section plane. FIG. 4b shows a section of a top view on the side of the flame trap filter 14 structured by compression.

Between the webs 17i, 17ii less compressed cushion-shaped areas 23 are formed such that as a whole a quilt structure results. These areas 23 form the grid openings 19, because the permeability of the flame trap filter 14 through the webs 17i, 17ii is compared with the permeability through the areas 23 at least remarkably reduced. The locations 22 can be compressed so intensively that the webs 17i, 17ii are gas impermeable. As illustrated in the embodiment according to FIG. 4A, side 24 of flame trap filter 14 having the quilt structure is opposed to flow direction D. The opposite side 25 is flat. In alternative embodiments the quilt-like three-dimensionally structured side 24 is orientated in flooding direction D. In again other embodiments the material for the flame trap filter 14 and/or the semi-finished product is compressed from both sides 24, 25 such that two opposite orientated sides 24, 25 result that can be three-dimensionally structured, e.g. quilt-like.

The material can comprise one or multiple layers, particularly woven layers. The material can comprise exclusively woven layers, for example. By mechanical deformation, however, a flame trap grid is created in total having a grid structure of web sections 17i, 17ii intersecting one another.

Figure 4A:
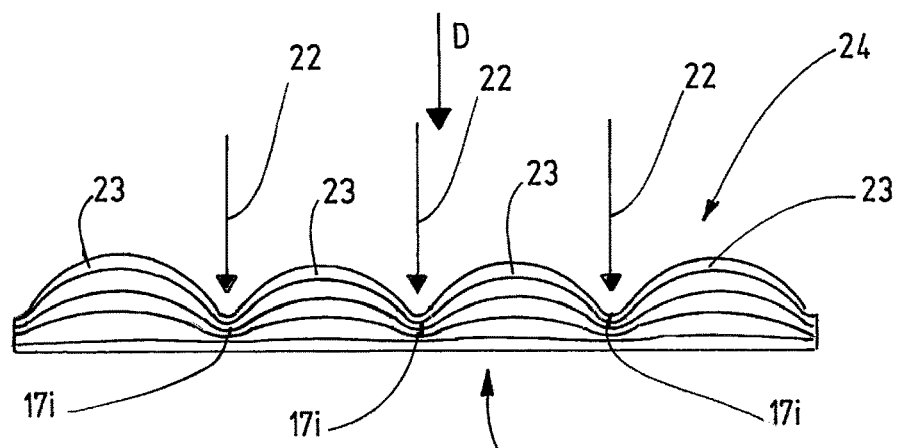
Figure 4B:
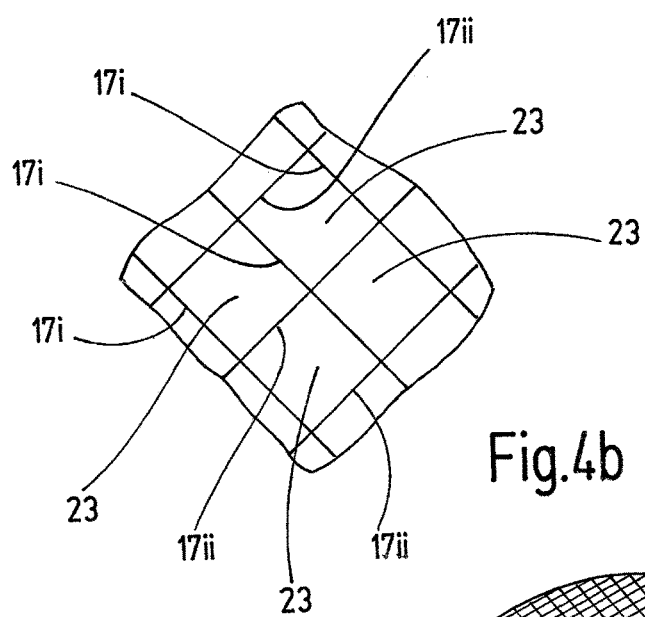

In embodiments as shown in FIGS. 4a and 4b, the thickness of flame trap filter 14 measured at web sections 17i, 17ii is less than the thickness measured in a grid opening 19 of grid structure 15. Measuring at a web section 17i, 17ii means that the web section 17i, 17ii is measured in straight line (parallel to flooding direction) between the two reference points, the distance of which is determined. The same applies for the grid opening 19.

Figure 5:
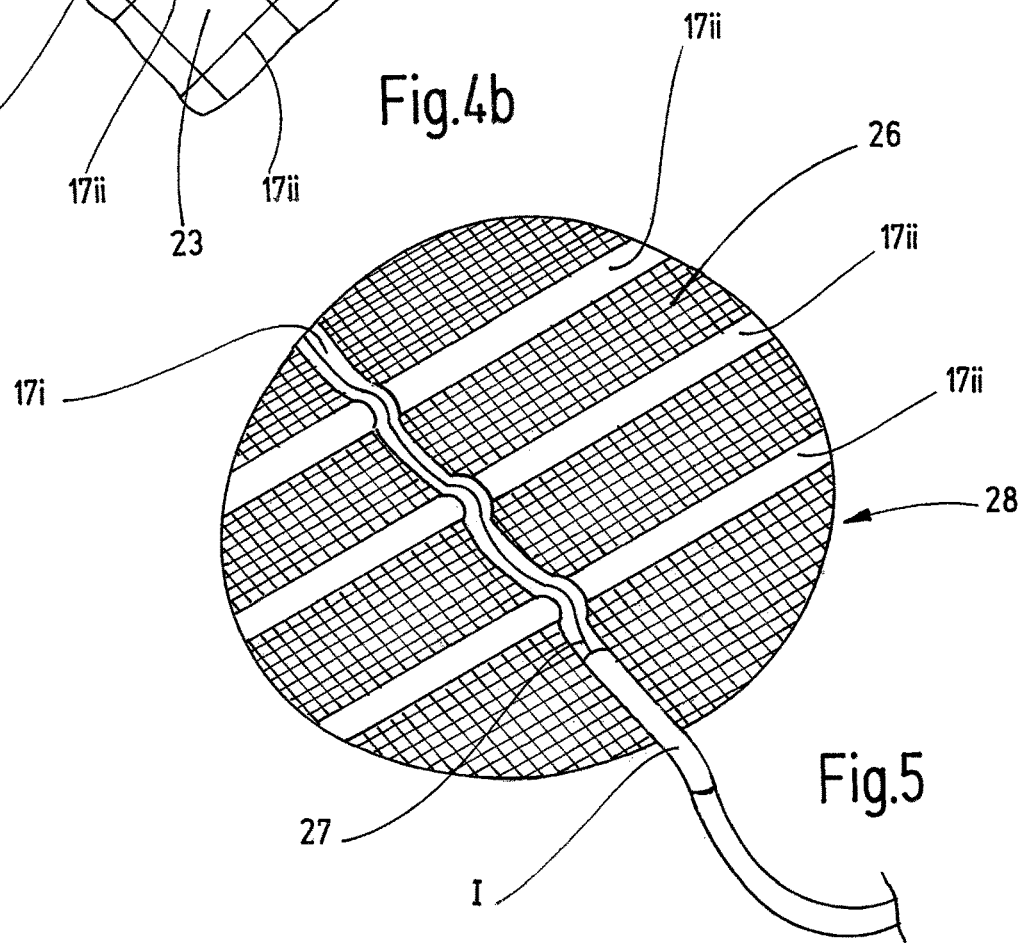

FIG. 5 shows an example of a still further embodiment. For explanation the description above can be applied as long as it is not otherwise indicated in the following description. In the further embodiment the grid structure 15 is at least partly manufactured by solidifying a substance on a substrate 26. The substrate 26 can be an aid that has to be removed again for providing the flame trap filter 14. As an alternative—and as illustrated—a substrate 26 can form at least one layer of the flame trap filter 14.

In the embodiment illustrated in FIG. 5 webs 17ii of one layer of one direction R1 are already manufactured. A web 17ii extending in a direction orientated transverse thereto, preferably orthogonal is manufactured by means of an instrument I in that material 27 is applied on the flame trap filter semi-finished product 28 and is solidified there to form a web 17i. The material 27 can be, e.g. silicone or adhesive. It is also possible to solidify at least partly liquid or soft material on the substrate 26. For example, the web sections 17i, 17ii can be formed by weld beads. A possibility is to apply metal powder on substrate 26 and to at least partly melt them, e.g. by means of a laser, such that the metal particles connect during solidification. The web sections 17i, 17ii can be particularly manufactured by laser deposit welding or by another manufacturing method suitable for additive manufacturing of webs. Thereby, besides metal, also plastic or materials based on natural substances can be introduced or applied. If webs 17i, 17ii are created, a laid scrim of webs 17i, 17ii is obtained.

Independent from the configuration in particularly preferred embodiments, some layers or all layers 20.2 to 20.8 that can be present in addition to the grid structure 15 in the flame trap filter 14 are free from connection locations within the projection of each area of grid openings 19 of grid structure 15 in flooding direction D. In other words, the space that is passed by the virtual shift of an area of grid opening 19 in flooding direction D is preferably free of connection locations. From this a highly increased flow resistance results at the web sections 17i, 17ii, however, a remarkably lesser flow resistance between web sections 17i, 17ii.

According to the invention, a flame trap filter 14, 14a, 14b having a grid structure 15, 15a is provided, wherein the grid structure 15, 15a defines grid openings 19 that are limited by web sections 17i, 17ii intersecting one another and/or wherein the grid structure 15, 15a is formed by a laid scrim. An inventive method for manufacturing a grid structure 15, 15a of a flame trap filter 14, 14a, 14b comprises the step of solidifying a substance 27 on a substrate 26 in order to form at least one web section 17i, 17ii of grid structure 15, 15a. As an alternative or in addition, the method can, for example, comprise the step of compressing a material for the flame trap filter 14, 14a, 14b or a semi-finished product 28 of flame trap filter 14, 14a, 14b at locations 23—for example by mechanical deformation of the material or the semi-finished product 28, in order to form at least one web section 17i, 17ii of grid structure 15, 15a.

| List of Reference Signs: | |
| --- | --- |
| 10 | Housing |
| 11 | Interior |
| 12, 12a | pressure relief opening |
| 12b | pressure relief opening |
| 13, 13a | first pressure relief body |
| 13b | second pressure relief body |
| 14, 14a | (first) flame trap filter |
| 14b | second flame trap filter |
| 15, 15a | grid structure |
| 16 | partial opening |
| 17, 17i, 17ii | web section |
| 18 | wall |
| 19 | grid opening |
| 20.1-20.8 | layers |
| 21 | opening |
| 22 | locations |
| 23 | area |
| 24 | side |
| 25 | side |
| 26 | substrate |
| 27 | material |
| 28 | semi-finished product |
| 29 | warp element |
| 30 | weft element |
| 31 | mesh |
| D | flooding direction |
| R1 | first direction |
| R2 | second direction |
| b | width |
| I | instrument |
| A | section |

The invention claimed is:

1. A flame trap filter, comprising:
a plurality of grid structures, that define a body, wherein at least one grid structure of the plurality of grid structures is manufactured by laser cutting or stamping from a foil or a sheet material, each of the plurality of grid structures, comprising:
a first layer of webs orientated in a first direction; and
a second layer of webs orientated in a second direction transverse to the first direction such that a plurality of grid openings are formed, and
wherein the plurality of grid structures allow fluid flow in an axial direction with respect to the body as well as two different transverse directions with respect to each other and the axial direction.

2. A flame trap filter, comprising:
a plurality of grid structures, that define a body, each grid structure of the plurality of grid structures is formed of a laid scrim, comprising:
a first layer of webs orientated in a first direction; and
a second layer of webs orientated in a second direction transverse to the first direction such that a plurality of grid openings are formed, wherein the plurality of grid structures allow fluid flow in an axial direction with respect to the body as well as two different transverse directions with respect to each other and the axial direction, and wherein the first layer of webs and the second layer of webs are manufactured by solidification of a substance on a substrate.

3. The flame trap filter according to claim 2, wherein the flame trap filter forms a pressure relief body for a protected housing for an electrical operating means.

4. The flame trap filter according to claim 2, wherein each grid structure of the plurality of grid structures is planar.

5. The flame trap filter according to claim 2, wherein at least one grid structure of the plurality of grid structures forms a terminal layer on a side of the flame trap filter facing opposite a flow direction or a terminal layer on a side of the flame trap filter facing in a flow direction.

6. The flame trap filter according to claim 5, wherein at least one grid structure of the plurality of grid structures is connected to another one of the plurality of grid structures by means of sintering, gluing and/or in a form-fit manner.

7. The flame trap filter according to claim 2, wherein the plurality of grid structures comprise openings, an opening area of which is defined in an opening area range, wherein the opening area of each of the plurality of grid openings is multiple times larger than a largest opening area within the opening area range.

8. The flame trap filter according to claim 7, wherein the opening area of each of the plurality of grid openings is about at least five times or at least ten times larger than a largest opening area of the opening area range.

9. The flame trap filter according to claim 2, wherein the substance closes openings of a layer of the flame trap filter.

10. The flame trap filter according to claim 2, wherein the flame trap filter comprises multiple layers that are free from connection locations within a projection of the plurality of grid openings in or against a flooding direction.

11. A pressure relief device having a flame trap filter according to claim 2.

12. The flame trap filter according to claim 3, wherein each grid structure of the plurality of grid structures is planar.

13. The flame trap filter according to claim 12, wherein at least one grid structure of the plurality of grid structures forms a terminal layer on a side of the flame trap filter facing opposite a flow direction or a terminal layer on a side of the flame trap filter facing in a flow direction.

14. The flame trap filter according to claim 2, wherein the first direction is orthogonal to the second direction and/or fluid flow in each of the two different transverse directions establishes an equalizing flow without being blocked from the first layer of webs or the second layer of webs.

15. A method for manufacturing a flame trap filter, the flame trap filter having a plurality of grid structures that define a body, wherein each grid structure of the plurality of grid structures is formed of a laid scrim, comprising: a first layer of webs orientated in a first direction; and a second layer of webs orientated in a second direction transverse to the first direction such that a plurality of grid openings are formed, wherein the plurality of grid structures allow fluid flow in an axial direction with respect to the body as well as two different transverse directions with respect to each other and the axial direction, and wherein the first layer of webs and the second layer of webs are formed from a substance that is solidified on a substrate, and/or wherein a material for the flame trap filter or a semi-finished product of the flame trap filter is compressed at locations to form one of the plurality of grid structures.

* * * * *